United States Patent [19]

Koller et al.

[11] 4,403,907
[45] Sep. 13, 1983

[54] CAM-DRIVEN ROTARY PICK-AND-PLACE ASSEMBLY APPARATUS

[75] Inventors: Frank H. Koller, Norridge; Jeffrey P. Peterson, Evanston, both of Ill.; Robert E. Snizek, Colorado Springs, Colo.

[73] Assignee: Emerson Electric Co., St. Louis, Mo.

[21] Appl. No.: 293,996

[22] Filed: Aug. 18, 1981

[51] Int. Cl.³ .................. B23Q 7/04; B65G 47/90
[52] U.S. Cl. .................. 414/744 R; 414/590; 414/591
[58] Field of Search .............. 414/744, 1, 4, 7, 590, 414/591, 738, 739; 74/24, 425, 465; 198/339, 448, 750; 269/56, 57

[56] References Cited

U.S. PATENT DOCUMENTS

| | | | |
|---|---|---|---|
| 3,314,296 | 4/1967 | Clark et al. | 74/24 |
| 3,597,990 | 8/1971 | McCartin | 74/425 X |
| 3,731,545 | 5/1973 | Beezer | 74/24 |
| 3,817,116 | 6/1974 | Georgieff | 74/465 X |
| 3,869,924 | 3/1975 | Beezer | 74/24 |
| 4,024,963 | 5/1977 | Hautau | 414/52 |
| 4,027,767 | 6/1977 | Gluck | 198/339 |
| 4,036,374 | 7/1977 | Woltjen | 414/591 |
| 4,134,305 | 1/1979 | Hautau | 74/24 |
| 4,139,104 | 2/1979 | Mink | 414/744 A |
| 4,293,268 | 10/1981 | Mink | 414/591 |

OTHER PUBLICATIONS

Ferguson Machine Co., Bulletin No. H75B, "Parts Handlers", 1975.
Commercial Cam Co. Drawing No. 5720, dated 5/8/68, entitled Spec. 662-P Index Drive with Reciprocating Center Post.
Commercial Cam Co. Drawing No. 9292, dated 1/25/71, entitled Series "A" Index Drive with Reciprocating Dial.

Primary Examiner—Robert J. Spar
Assistant Examiner—Terrance L. Siemens
Attorney, Agent, or Firm—McCaleb, Lucas & Brugman

[57] ABSTRACT

A cam-driven, rotary-type, pick-and-place assembly apparatus for providing linear translation as well as rotary movement to a support member carrying a gripping mechanism, including a housing, motor-driven input shaft carrying two drive cams, a follower wheel assembly rotatably journaled on said housing and drivably oscillated by one of the drive cams, a main guide shaft and a secondary guide shaft slidably received within the follower wheel, the support member mounted stop the guide shafts, a connector plate joining the lower ends of the guide shafts, a follower wheel lift shaft assembly drivably oscillated by the other of the drive cams, the oscillated lift shaft assembly operatively connected to the connector plate and guide shafts by a toggle linkage assembly, which assembly permits simultaneous rotational and linear oscillation of the guide shafts.

7 Claims, 5 Drawing Figures

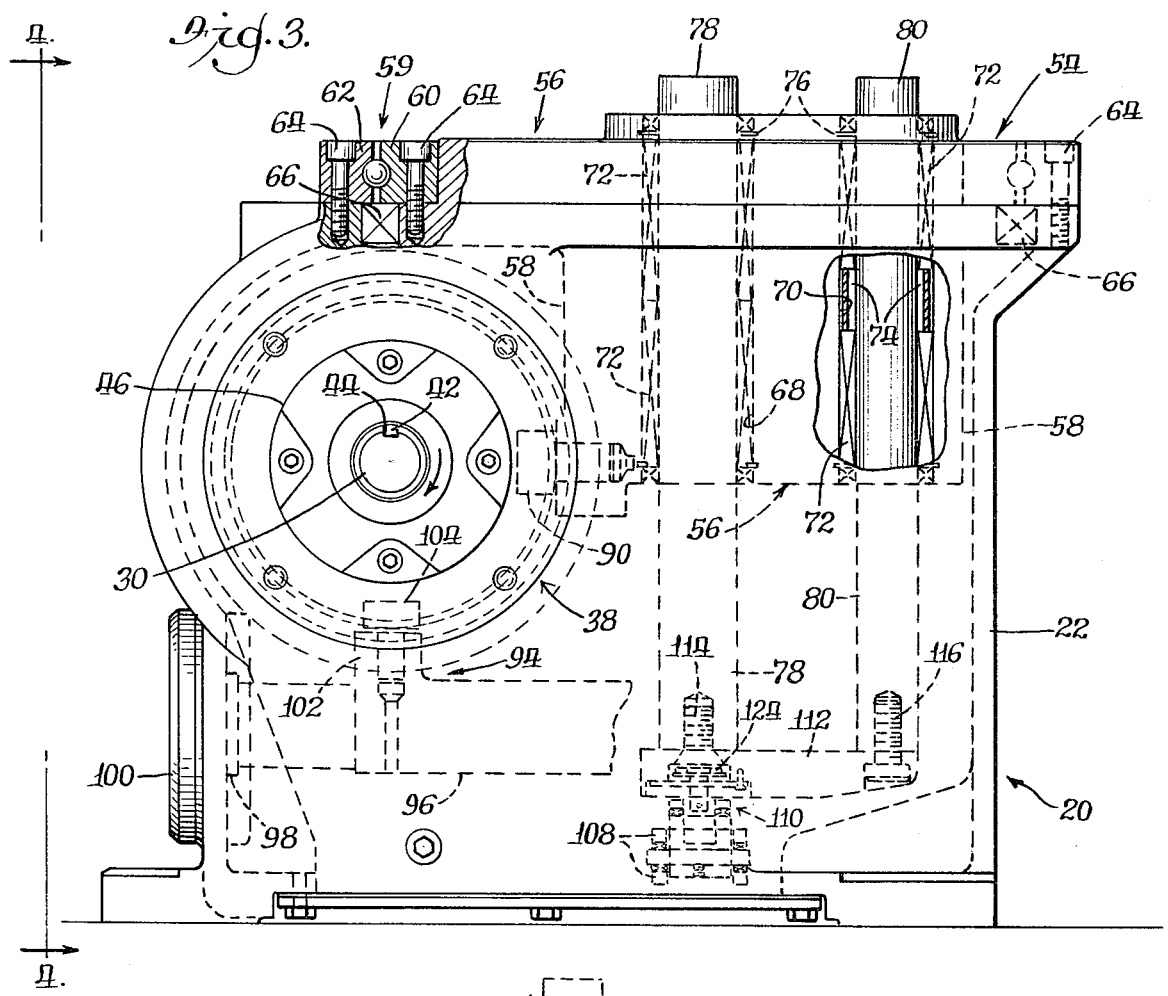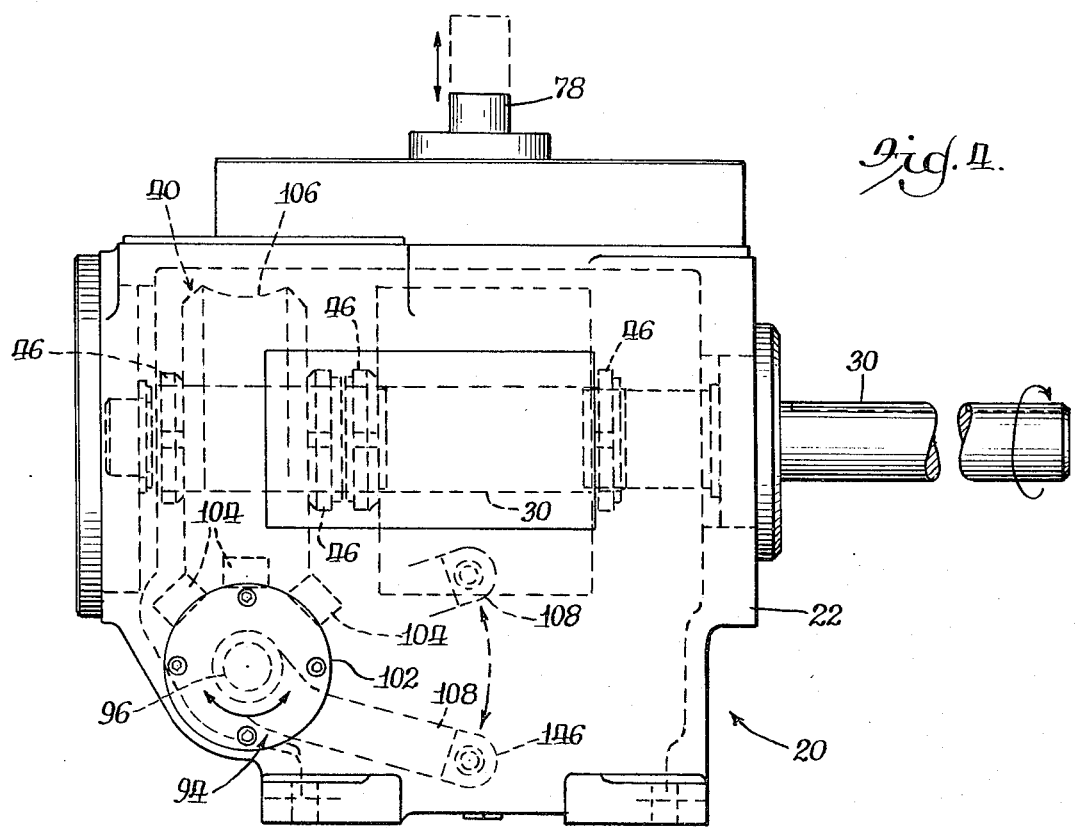

CAM-DRIVEN ROTARY PICK-AND-PLACE ASSEMBLY APPARATUS

FIELD OF THE INVENTION

This invention relates to material handling apparatus and more specifically a cam-driven, pick-and-place assembly apparatus which provides both linear and rotational movement during the transfer of a workpiece.

There are numerous industrial applications for material handling apparatus or so-called industrial robots in which a workpiece is automatically transferred from one work station to another. The devices currently available for performing material handling operations in which both rotary and linear movements are provided are typified by U.S. Pat. Nos. 3,731,545, 3,869,924, and 4,139,104.

Such material handling devices utilize a main guide shaft which normally comprises a single or sometimes multiple elements. Due to the necessity of permitting rotation of such a guide shaft about its axis while it undergoes linear translation, such prior art devices utilize a specialized connector structure. This connector is typically in the form of an oscillated drive pin or roller which rides within a track formed on a yoked-collar member, the collar member itself being rigidly mounted to the rotating guide shaft. Such an eccentric, rather than direct axial, loading configuration for the rotating guide shaft of such an assembly device has a significant disadvantage. That is, such an eccentric connector creates an axial backlash in the main guide shaft and the components carried thereby. This backlash is primarily caused by the clearance which is unavoidably present between the oscillated pin or roller member and the yoked-collar member or roller track within which the former member rides. Because the automatic transfer of workpieces between work stations must be accomplished with extreme accuracy, any axial backlash problem is highly undesirable. Additionally, many of the guide shafts of the prior art devices do not provide sufficient support for the associated support members which are utilized to transfer workpieces. Thus, with such devices there is oftentimes a problem with the operational stability of the pick-and-place gripping mechanisms carried by such support members.

SUMMARY OF THE INVENTION

The present invention overcomes the above-noted problems found in the prior art devices by utilizing a main guide shaft which is rigidly connected at both ends to a secondary or outer guide shaft for purposes of stability. Further, the present invention provides direct axial loading, i.e., transmission of linear translation, of the main guide shaft through use of the herein-disclosed toggle linkage assembly, rather than by using an eccentric loading configuration. By providing such direct axial loading of the main guide shaft, the toggle linkage assembly eliminates any unwanted axial backlash. Additionally, the toggle linkage assembly simultaneously permits rotational movement about the main guide shaft's axis.

In addition to a housing, the present invention includes a motor-driven constant speed input shaft which carries two drive cams, namely, a rotary cam and a lift cam. A follower wheel assembly is rotatably oscillated through a desired angle by the rotary cam, preferably in a horizontal direction. The follower wheel assembly also carries a main guide shaft and a secondary guide shaft which are slidably received within parallel bores formed in the follower wheel. Further, a follower wheel lift shaft is oscillated, preferably about a generally horizontal axis, under the control of the lift cam. The follower wheel lift shaft has a radially-extending lift shaft clevis which, due to the oscillation thereof by the lift cam, is operable to raise and lower, i.e., linearly translate, the parallel guide shafts within the follower wheel. This action is achieved through use of the toggle linkage assembly which both rotatably and pivotally connects the oscillated lift shaft clevis to the guide shafts.

Accordingly, it is a primary object of the present invention to provide a cam-driven, rotary pick-and-place parts handling device having a main guide shaft which is directly axially loaded for linear translation.

It is a further object to provide, in a rotary parts handling device, a toggle linkage assembly which provides both a rotary and pivotal connection between the linearly oscillating lift shaft clevis and the rotatably oscillating guide shaft.

It is another object to provide a rotary parts handling device in which any axial backlash of the main guide shaft is substantially eliminated.

It is yet a further object to provide main and secondary guide shafts for a rotary material handling device which are rigidly connected to one another at their respective ends so as to provide increased operational stability to the pick-and-place elements carried by such guide shafts.

The means by which the foregoing and other objects of the present invention are accomplished and the manner of their accomplishment will be readily understood from the following specification upon reference to the accompanying drawings, in which:

FIG. 3 is an enlarged elevation view of the apparatus of FIG. 2 as viewed along lines 3—3 thereof, with certain components removed or outlined for better viewing;

FIG. 4 is another elevation of the present parts handling device, as viewed along lines 4—4 of FIG. 3.

DESCRIPTION OF THE PREFERRED EMBODIMENT

Figure 1:
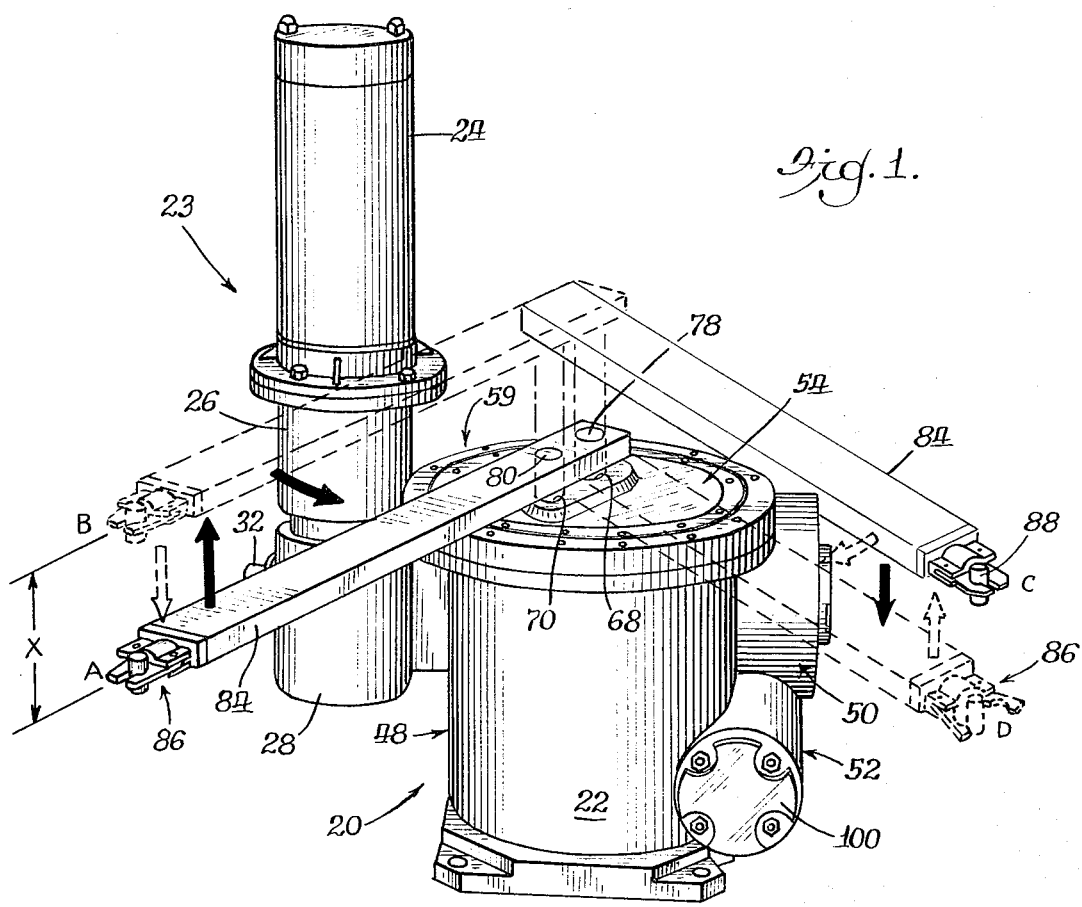
FIG. 1 is a perspective view of the rotary pick-and-place apparatus of the present invention which additionally depicts multiple positions for the pick-and-place mechanism carried thereby.

Having reference to the drawings, wherein like reference numbers indicate corresponding elements, there is shown in FIG. 1 an illustration of the rotary material handling apparatus of the present invention, generally depicted by reference numeral 20. Unless otherwise noted, the various components of apparatus 20 described below are preferably formed of suitable metallic materials. The apparatus 20 comprises a main housing 22 which can be supported upon the floor or any suitable support stand (not shown). Power is provided to the apparatus 20 by a drive system 23 which includes a motor 24, a bell-shaped adapter 26, and a worm gear reducer 28 which is directly mounted to the housing 22.

A main input or drive shaft 30 is driven by the drive system 23 through a constant speed, preferably unidirectional rotation. It is to be noted, however, that while the preferred embodiment utilizes a unidirectional input shaft 30, for certain complex cam motions which may be required in specific assembly operations, the input shaft 30 may be required to rotate bi-directionally; this, however, will not affect the operation of the present invention.

While not necessary for the successful operation of the present invention, a reduced-diameter end section 32 of drive shaft 30 carries two timing cam members 34a, 34b. As will be explained in detail later herein, upon rotation of drive shaft 30, cam members 34a, 34b operate a pair of corresponding cam limit switches 36a, 36b.

Figure 2:
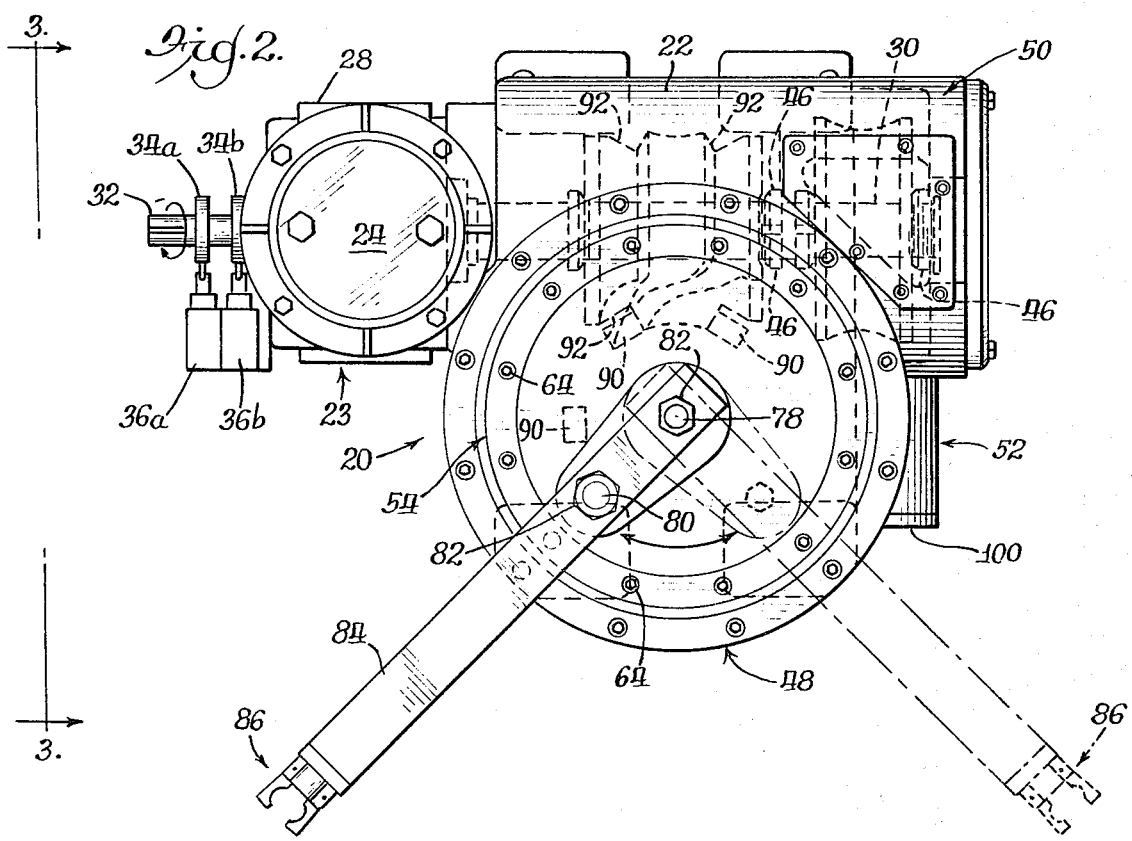
FIG. 2 is a plan view of the rotary parts handling apparatus of FIG. 1 and depicting various components thereof in outline.

As best seen in FIGS. 2, 3, and 4, the main drive shaft 30 carries two drive cam members, namely, a rotary cam 38 and a linear or so-called lift cam 40. The drive cams 38, 40 are preferably of the roller gear design. They are each axially and circumferentially positioned about the shaft 30, so as to be rotatably driven thereby, by a key 42 carried within an axial keyway 44 formed on shaft 30, as well as by a pair of lock nuts 46.

For purpose of reference, the main housing 22 can be seen (FIGS. 1 and 2) to comprise three distinct segments, namely, a follower wheel housing portion 48, a cam housing portion 50, and a lift shaft housing portion 52. A follower wheel assembly, generally depicted by reference numeral 54, operates within the housing portion 48. The follower wheel assembly 54 comprises a follower wheel 56 having a reduced-diameter lower section 58. The follower wheel 56 mounts to the upper portion of main housing 22 by the well-known, so-called four-point-contact type of ball bearing assembly 59. The bearing assembly 59 comprises an inner bearing race 60 and an outer bearing race 62. These bearing races 60, 62 are respectively fastened to the follower wheel 56 and main housing 22 by a series of threaded fasteners 64. A seal 66, preferably formed of a material suitable to operate in industrial gear oil at a maximum temperature of approximately 170° F. is positioned underneath the bearing assembly 59 so as to retain lubricant within the sealed housing 22, as well as to prevent introduction of unwanted contaminants into the interior of apparatus 20.

A pair of vertically-aligned, parallel guide shaft bores 68, 70 are formed through the follower wheel 56 (FIGS. 1 and 3). A pair of linear ball bushings 72, separated by a spacer sleeve 74, are retained within each of the guide shaft bores 68, 70 by retainer rings 76. An elongated main or center guide shaft 78 is slidably received within the center guide shaft bore 68 and its associated bushing 72. Likewise, a guide shaft 80, preferably of equal length to, but of a smaller diameter than center guide shaft 78, is slidably received within the outer bore 70. Rigidly attached to the respective upper ends of guide shafts 78, 80, such as by threaded fasteners 82, is an elongated pick-and-place support bar 84. It is to be noted that any of the several well-known forms of gripping mechanisms, such as the mechanical hand 86 depicted in FIGS. 1 and 2, can be fastened to the outer end of the support bar 84 and automatically operated by well-known control means (not shown) to pick up and place a workpiece 88.

As best seen in FIGS. 2 and 3, a plurality of cam followers 90 are rotatably fastened about the periphery of lower follower wheel section 58 and are in radial alignment thereto. The cam followers 90 are operatively engaged with respective cam surfaces 92 which are formed about the periphery of rotary cam 38.

Turning to FIGS. 3 and 4, there is shown a lift shaft assembly, generally denoted by reference numeral 94. The lift shaft assembly 94 comprises a follower wheel lift shaft 96 which is retained at its respective ends by suitable bearings 98, and further, is covered at one end by a plate 100. Formed integrally with the lift shaft 96 is an enlarged radial boss 102 which carries a plurality of cam followers 104. The cam followers 104 engage respective cam surfaces 106 which are formed about the periphery of lift cam 40. Also formed integrally with the follower wheel shaft 96 is a radially-extending lift shaft clevis 108 (FIG. 4).

Figure 5:
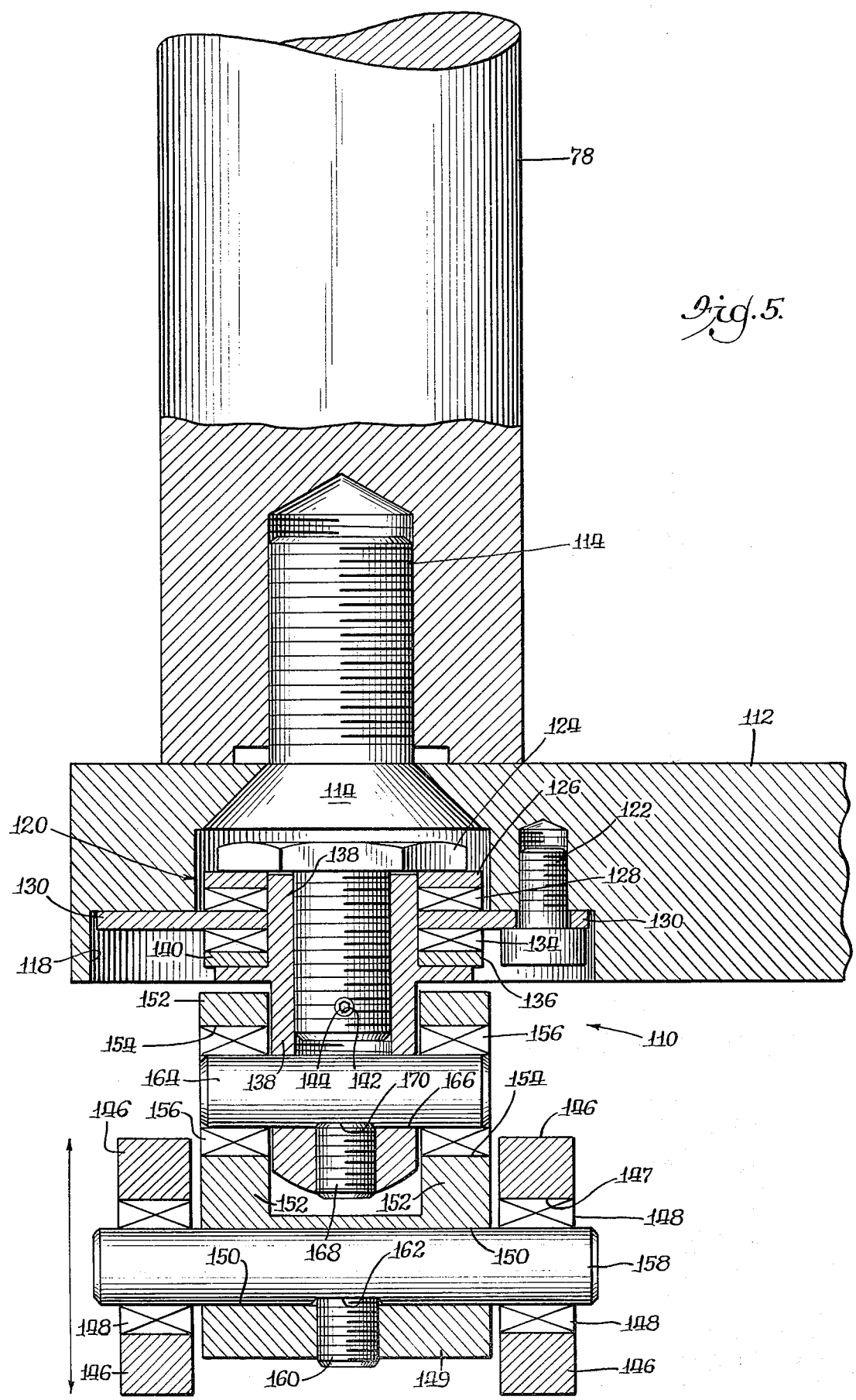
FIG. 5 is an enlarged sectional view of the toggle linkage assembly of the present invention, as depicted in FIG. 3.

Depicted in FIGS. 4 and 5 is the toggle linkage assembly of the present invention, generally denoted by reference numeral 110. The toggle linkage assembly 110 generally comprises a rotatable segment, i.e., a bearing plate assembly 120, as well as a pivotal segment, i.e., a pivot clevis 149, which segments are described in detail later herein. Further, a connector plate 112 is rigidly fastened at one of its ends to the center guide shaft 78 by a flat head threaded fastener 114, and at its other end to the outer guide shaft 80 by a low head cap threaded fastener 116. It will be seen (FIGS. 4 and 5) that the lower left end of connector plate 112 has a configured recess 118 formed therein.

The bearing plate assembly 120 is mounted to the connector plate 112 within the recess 118 by a plurality of threaded fasteners 122. The bearing plate assembly 120 comprises a hex-head clevis bolt 124, a thrust washer 126, a thrust needle bearing 128, a bearing retainer plate 130 which has apertures 132 to accept the mounting fasteners 122, a second thrust needle bearing 134, and a second thrust washer 136. The respective needle bearings and thrust washers, it will be seen, permit rotation of plate 130 within the assembly 120. An internally-threaded clevis link 138 is threaded over the end of the clevis bolt 124 until an annular rib 140 of link 138 is engaged against the lower thrust washer 136. It will be understood that, by controlling the degree of threading of clevis link 138 onto clevis bolt 124, the annular rib 140 can be utilized to establish a pre-selected preload within the rotatable bearing plate assembly 120. Once the desired preload is attained during assembly of assembly 120, a hole 142 is drilled through both the clevis link 138 and bolt 124 through which a roll pin 144 is fitted. It will also be understood that, besides maintaining the preload within bearing plate assembly 120, the roll pin 144 acts to prevent any unwanted separation of assembly 120 during use.

As depicted in FIGS. 4 and 5, the clevis 108 of lift shaft assembly 94 terminates at its outer end in a clevis yoke 146, each segment of which has an aperture 147 carrying a needle bearing 148. A separate pivot clevis member 149 has an aperture 150 and terminates in two yoke segments 152. The latter have coaxially-aligned apertures 154 carrying needle bearings 156. By use of a dowel pin 158 (FIG. 5) carried within the needle bearings 148, the pivot clevis 149 is pivotally mounted to the yoked end 146 of lift shaft clevis 108. The pin 158 is rigidly secured to pivot clevis 149 within the aperture 150 by a set screw 160 engaged against a flatted portion 162 of pin 158.

Likewise, at its other or yoked end, the pivot clevis 149 is again pivotally connected, this time to the clevis link 138 of bearing plate assembly 120. This particular pivotal connection is accomplished by use of a dowel pin 164 which is journaled within needle bearings 156 of yoke segments 152. The pin 164 is also inserted through an aperture 166 formed within clevis link 138 (FIG. 5) and secured thereto by a set screw 168 which engages a flatted portion 170. It will be understood that the two set screws 160, 168 are used to prevent axial movement of the dowel pins 158, 164, respectively, and thus, to prevent any unwanted separation of the toggle linkage assembly 110 during use.

As described in more detail later herein, the above-noted pivotal connections of pivot clevis 149 allow the toggle linkage assembly 110 to pivotally transmit linear translation, i.e., lifting motion in a vertical direction in this preferred embodiment of the present invention, to the guide shafts 78, 80. Simultaneously, through the rotational capabilities of bearing plate assembly 120, the toggle linkage assembly 110 is able to accommodate the rotational movements (in a horizontal direction in the preferred embodiment) of the two guide shafts 78, 80, as joined by the connector plate 112. Stated another way, the toggle linkage assembly 110 enables the guide shafts 78, 80 to freely rotate, about the axis of guide shaft 78, as they are rotatably oscillated with the rotatably-driven follower wheel 56 along one direction, while at the same time assembly 110 pivotally transmits linear translation from the oscillated lift shaft clevis 108 to the guide shafts 78, 80 along a second direction.

Turning now to a description of the operation of the present invention, it will be understood that it is sometimes desired to transfer parts, such as workpiece 88, from one work station (position A in FIG. 1) to a second station (position D). For purposes of reference here, it will be understood that a full cycle operation of the rotary material handling apparatus 20 starts with the pick-and-place support bar 84 at position A, continues with the transfer of workpiece 88 by bar 84 to position D, and is complete when bar 84 returns to position A, where it is then ready to pick up the next part. It will be remembered that the drive system 23 causes the input shaft 30 to be driven through a constant rotational speed of, for example, 30 rpm in the preferred embodiment, in the direction shown by the arrows (FIGS. 2, 3 and 4). While not important to the present invention, the drive system 23 can be mounted on the end opposite of cam housing portion 50 from that shown in FIG. 1. Additionally, drive system 23 can be so mounted as to extend upwardly, downwardly, or horizontally to either side of housing 22.

Starting with bar 84 at the pick-up position (position A), rotation of input shaft 30 simultaneously rotates both the rotary cam 38 and lift cam 40. As there is a dwell (not shown) on rotary cam 38 in this particular portion of the operating cycle, such rotation of lift cam 40 causes displacement of the cam followers 104 of lift shaft assembly 94. Such displacement of followers 104 causes the assembly 94 (follower wheel lift shaft 96, radial portion 102, and lift shaft clevis 108) to oscillate in a counterclockwise direction (FIG. 4). Such counterclockwise oscillation causes lift shaft clevis 108 to translate vertically, along the dotted arcuate line in FIG. 4, to its uppermost position.

It is to be noted that the lift shaft clevis 108 operates over a generally arcuate path, in a vertical direction in the preferred embodiment. On the other hand, the guide shafts 78, 80, as joined by connector plate 112 and support bar 84, are constrained to slide vertically within the bores 68, 70 of follower wheel 56. Thus, the connection between plate 112 and lift shaft clevis 108 must accommodate the latter member's arcuate line of travel. It is the toggle linkage assembly 110, through its various pivotally connected members, which operates to pivotally transmit arcuate lifting motion (linear translation) of clevis 108 to guide shafts 78, 80. Further, through use of toggle linkage assembly 110, the rotary material handling apparatus 20 is provided with a so-called center lift design for center guide shaft 78. Thus, instead of having the undesirable eccentric lift configuration of the prior art devices, the shaft 78 is directly axially loaded with the linearly translating action of the clevis 108 by the toggle linkage assembly 110.

The oscillated upward movement of lift shaft clevis 108 (FIGS. 4 and 5), as pivotally transmitted by the pivot clevis 149 and the various other components of toggle linkage assembly 110, causes connector plate 112 and guide shafts 78, 80 to be linearly translated, i.e., vertically raised to their extreme positions in the preferred embodiment (see dotted line positions in FIGS. 1 and 4). At the termination of this linear translation, i.e., a lift stroke in the preferred embodiment, the support bar 84 will be in the approximate position shown as position B (FIG. 1). It will be understood that this particular position for bar 84 will depend, of course, upon the point where the dwell (not shown) formed on cam surface 92 of rotary cam 38 changes into a drive portion, as cam 38 rotates.

When the bar 84 is in its full elevated position B (or preferably, at a point slightly prior to that time), the continued rotation of input shaft 30 causes rotary cam 38 to begin to swing bar 84 horizontally. That is, rotation of rotary cam 38 causes the drive portions (not shown) of cam surfaces 92 to engage cam followers 90 mounted on follower wheel 56. This, in turn, affects counterclockwise rotation (FIG. 2) of follower wheel 56 in a horizontal direction about the axis of center guide shaft 78. This counterclockwise oscillation of follower wheel 56 causes both outer shaft 80 to move between its extreme positions shown in FIG. 2, and the center shaft 78 to rotate about its own axis. Further, since connector plate 112 joins shafts 78, 80, this counterclockwise rotation of follower wheel 56 causes plate 112 to be horizontally oscillated with shafts 78, 80 about the axis of fastener 114, which axis is coaxial with center guide shaft 78.

It is seen then, that the toggle linkage assembly 110, due to its rotatably-connected members, operates to accommodate the rotation of guide shafts 78, 80 and connector plate 112. Further, toggle linkage assembly 110 permits this rotation while simultaneously pivotally connecting plate 112 to the oscillating clevis 108 so as to transmit the latter's linear translation.

A further rotation of rotary cam 38 via input shaft 30 causes the support bar 84 to be completely horizontally swung to position C of FIG. 1. For purposes of illustration only, FIGS. 1 and 2 show a rotary translation of bar 84 of approximately 90°. However, it should be noted that the maximum allowable rotary translation for the material handling apparatus 20 may be as much as 180°. This rotary stroke is essentially a function of the design of the rotary cam 38, which design is not a part of the present invention.

Continued rotation of lift cam 40 by drive shaft 30 causes the lift shaft clevis 108 of lift shaft assembly 94 to oscillate downwardly in a clockwise direction until returned to the lowermost position shown in FIG. 4. This lowering movement in turn causes the toggle linkage assembly 110, through its above-noted pivotal components, to translate connector plate 112 and guide shafts 78, 80 to their lowermost positions (FIGS. 1, 3, and 4). This action moves the support bar 84 to its so-called placing position (position D in FIG. 1).

It is at this placing position where an associated control mechanism (not shown) can operate in a well-known fashion to open mechanical hand 86 (FIG. 1), whereby the workpiece 88 is deposited into an adjacent work station or tool (not shown). It is to be understood that the exact degree of linear stroke (designated as the lift stroke distance "X" in FIG. 1) for apparatus 20 at both place position A and pick-up position D can be varied as required for each specific material handling operation. This linear stroke is a function of the design of the lift cam 40, which design is not a part of the present invention.

Continued further rotation of the drive shaft 30 and cams 38, 40 acts to reverse the linear and rotational movements of support bar 84. In other words, after part 86 is deposited at position D, the lift cam 40 acts to vertically oscillate lift shaft clevis 108. This causes the toggle linkage assembly 110, through its pivotal components, to linearly translate the guide shafts 78, 80 and support bar 84 upwardly. Further, the rotary cam 38 oscillates the follower wheel 56 in a clockwise direction (FIG. 2) whereby, through the rotary components of toggle linkage assembly 110, the guide shafts 78, 80 and bar 84 return to their left positions in FIG. 2. Finally, a further rotation of shaft 30 causes lift cam 40 to oscillate lift shaft clevis 108 downwardly. This action, in effect, linearly translates the guide shafts 78, 80 and bar 84 down to the starting point of apparatus 20, i.e, pick-up position A (FIG. 1).

It will be seen, then, that the toggle linkage assembly 110 performs two important functions in providing a connection between connector plate 112 and guide shafts 78, 80 on the one hand, and the lift shaft clevis 108 of lift shaft assembly 94 on the other hand. First, through the rotational components found in bearing plate assembly 120, assembly 110 permits rotation to occur along a first direction. Stated another way, the bearing plate assembly 120 of toggle linkage assembly 110 permits rotation of the bearing plate 130, and hence, the connector plate 112, about the threaded combination of the clevis bolt 124 and clevis link 138. It will be noted that this rotation is facilitated by the needle thrust bearings 128, 134 and the thrust washers 126, 136.

Second, and simultaneously with that rotational function, assembly 110 through its pivotal components pivotally transfers the linearly translating movement of the arcuately-oscillating lift shaft clevis 108 to the guide shafts 78, 80 along a second direction, which is normal to the first direction. That is, in the lower half of assembly 110, the clevis 149 pivots at its upper end about pin 164 which is carried by clevis link 138, and additionally pivots at its lower end about pin 158 which is journaled by lift shaft clevis 108. In performing these two functions, then, the toggle linkage assembly 110 pivotally transmits direct axial linear translation to the center guide shaft 78, and simultaneously accepts rotation of shafts 78, 80, which are rotatably driven by the follower wheel 56.

For purposes of illustration here, the present rotary material handling apparatus 20 is preferably supported by the floor or support stand such that the follower wheel assembly 54 is rotatably oscillated in a horizontal plane or direction, and further, the lift shaft clevis 108 and guide shafts 78, 80 are oscillated in a vertical plane or direction. It will be understood, however, that the apparatus can be supported in various other positions such that the assembly 54, and the clevis 108 and shafts 78, 80 respectively operate in other than horizontal and vertical alignments, although they always respectively operate in planes normal to one another.

The use of needle thrust bearings and needle roller bearings in toggle linkage assembly 110 has certain advantages. These bearings increase the overall stiffness and reliability of the toggle linkage assembly 110. More importantly, they act to virtually eliminate any axial backlash of the guide shafts 78, 80, and thus, the support bar 84. This latter advantage is a significant improvement over the undesirable backlash problems common to rotary material handling devices of the prior art, especially those which utilize an eccentric loading for the guide shafts.

Although not a part of the present invention, the cam-limit switches 36a, 36b, as activated respectively by timing cams 34a, 34b, can be used in a well-known fashion to stop and start the drive system 23. Such a control system would be desirable, for instance, when the time of operation for the associated tools (not shown) at the work stations (positions A and D in FIG. 1) is greater than the time required for the transfer of a workpiece as provided by the present rotary material handling apparatus 20.

From the foregoing, it is believed that those skilled in the art will readily appreciate the unique features and advantages of the present invention over previous types of rotary material handling devices and robotic parts handlers. Further, it is to be understood that while the present invention has been described in relation to a particular preferred embodiment as set forth in the accompanying drawings and as above described, the same nevertheless is susceptible to change, variation and substitution of equivalents without departure from the spirit and scope of this invention. It is therefore intended that the present invention be unrestricted by the foregoing description and drawings, except as may appear in the following appended claims.

The embodiments of the invention in which an exclusive property or privilege is claimed are defined as follows:

1. Material handling apparatus for transferring a workpiece from a first work station to a second work station, comprising in combination:
   a housing;
   an input shaft rotatably supported by said housing;
   motor means providing a constant speed rotation to said input shaft;
   driving cam means carried by said input shaft intermediate the ends thereof, said driving cam means comprising a first cam member and a second cam member;
   follower wheel means rotatably supported by said housing and having a pair of spaced parallel bores formed therein along a first direction, said follower wheel means carrying a plurality of cam followers engaged with said first cam member, whereby rotation of said input shaft causes said first cam member to affect timed rotary oscillation of said follower wheel means along a second direction, said second direction being in a plane normal to the plane of said first direction;
   follower wheel lift shaft means rotatably supported by said housing and having a radially-extending lift shaft clevis, said follower wheel lift shaft means carrying a plurality of cam followers engaged with said second cam member, whereby rotation of said input shaft causes said second cam member to effect timed oscillation of said follower wheel lift shaft means whereby said lift shaft clevis is oscillated along said first direction;

output shaft means slidably mounted within said spaced parallel bores of said follower wheel means and operable to be linearly oscillated along said first direction, said output shaft means further operable to be rotatably oscillated with said rotatably-driven follower wheel means along said second direction, said output shaft means characterized as comprising a center guide shaft and an outer guide shaft joined at their respective lower ends by connector means;

toggle linkage assembly means operatively connecting said follower wheel lift shaft means with said output shaft means, said toggle linkage assembly characterized as being rotatably connected to said connector means and pivotally connected to said lift shaft clevis;

whereby said toggle linkage assembly, in response to oscillation of said lift shaft clevis, transfers linear oscillation along said first direction to said connector means and thereby to said center and outer guide shafts, while said toggle linkage assembly, when said guide shafts are rotatably oscillated by said rotatably-driven follower wheel means, permits rotation along said second direction between said lift shaft clevis on the one hand and said connector means and said center and outer guide shafts on the other hand.

2. The invention of claim 1, wherein said center guide shaft and outer guide shaft are joined at their respective upper ends by support bar means.

3. The invention of claim 2, and gripping means carried by said support bar means for releasably gripping a workpiece.

4. The invention of claim 1, wherein said toggle linkage assembly comprises bearing plate assembly means rotatably mounted to said connector means, and clevis link means pivotally mounted at one end to said bearing plate assembly means and at its other end to said lift shaft clevis.

5. The invention of claim 1, and wherein said first and second cam members comprise roller gear cams.

6. The invention of claim 1, and wherein said constant speed input shaft rotates unidirectionally.

7. A rotary, pick-and-place assembly apparatus of the type including a housing; a constant-speed input shaft which carries a rotary cam and a lift cam; a follower wheel assembly rotatably-journaled on the housing and drivably-engaged with the rotary cam, the follower wheel assembly including a follower wheel and a pair of parallel guide shafts which are connected at their respective lower ends and which are slidably-received within bores formed in the follower wheel, whereby rotation of the rotary cam affects timed rotary oscillation of the follower wheel and the guide shafts along one direction; a lift shaft assembly rotatably-journaled on the housing and drivably-engaged with the lift cam, the lift shaft assembly including a radially-extending lift shaft clevis, whereby rotation of the lift cam affects timed oscillation of the lift shaft clevis along another direction which is generally normal to the one direction, the improvement comprising:

a toggle linkage assembly rotatably and pivotally connecting the guide shafts to the lift shaft clevis, said toggle linkage assembly comprising bearing plate means and pivot clevis means, said bearing plate means characterized as being rotatably movable with the guide shafts and pivotally connected to said pivot clevis means, said pivot clevis means characterized as being pivotally mounted to the lift shaft clevis, whereby said toggle linkage assembly transfers linear oscillation to the guide shafts when the lift shaft clevis is oscillated along the other direction, while permitting rotation of said guide shafts with and when the follower wheel assembly is oscillated along the one direction.

* * * * *